United States Patent [19]
Griffiths

[11] Patent Number: 5,819,885
[45] Date of Patent: Oct. 13, 1998

[54] BRAKE AND ACTUATOR ASSEMBLY

[75] Inventor: Alan Godfrey Griffiths, Staffordshire, England

[73] Assignee: Lucas Industries public limited company, Solihull, England

[21] Appl. No.: 682,647
[22] PCT Filed: Jan. 30, 1995
[86] PCT No.: PCT/GB95/00074
§ 371 Date: Jul. 26, 1996
§ 102(e) Date: Jul. 26, 1996
[87] PCT Pub. No.: WO95/21338
PCT Pub. Date: Aug. 10, 1995

[30] Foreign Application Priority Data

Feb. 1, 1994 [GB] United Kingdom ............... 9401886

[51] Int. Cl.$^6$ ................ F16D 55/02; F16D 65/56
[52] U.S. Cl. .......................... 188/72.8; 188/71.9
[58] Field of Search ................. 188/72.3, 72.6, 188/72.8, 72.9, 79.55, 196 B, 196 BA, 196 M, 355–360; 192/94

[56] References Cited

U.S. PATENT DOCUMENTS

| 3,465,603 | 9/1969 | Lindstrom | 188/79.55 |
| 4,014,411 | 3/1977 | Troester | 188/72.8 |
| 4,022,300 | 5/1977 | Afanador et al. | 188/79.55 |
| 4,036,330 | 7/1977 | Henning et al. | 188/72.8 |
| 4,529,067 | 7/1985 | Scott | 188/72.8 |
| 4,644,812 | 2/1987 | Nelson | 188/196 M |
| 5,477,945 | 12/1995 | Klass et al. | 188/79.55 |

FOREIGN PATENT DOCUMENTS

| 0136434 | 4/1985 | European Pat. Off. | 188/79.55 |
| 2558581 | 7/1977 | Germany | 188/79.55 |

*Primary Examiner*—Robert J. Oberleitner
*Assistant Examiner*—Chris Schwartz
*Attorney, Agent, or Firm*—Trexler, Bushnell, Giangiorgi & Blackstone, Ltd.

[57] ABSTRACT

A brake and actuator assembly is disclosed, and includes a brake having an actuating shaft operable to cause friction elements of the brake to be urged against a rotary braking member. The assembly also includes a brake actuating mechanism to which the shaft is operably connected for brake actuation. The shaft forms a splined connection, at a location spaced from the actuating mechanism, with a coupling device coupled to an output member of a power device, enabling the position of force application from the power device to the shaft to vary along the shaft to accommodate friction element wear in the brake. The line of force application between the output member and the shaft lies generally in a radial plane extending through the member, coupling device and splined connection.

15 Claims, 1 Drawing Sheet

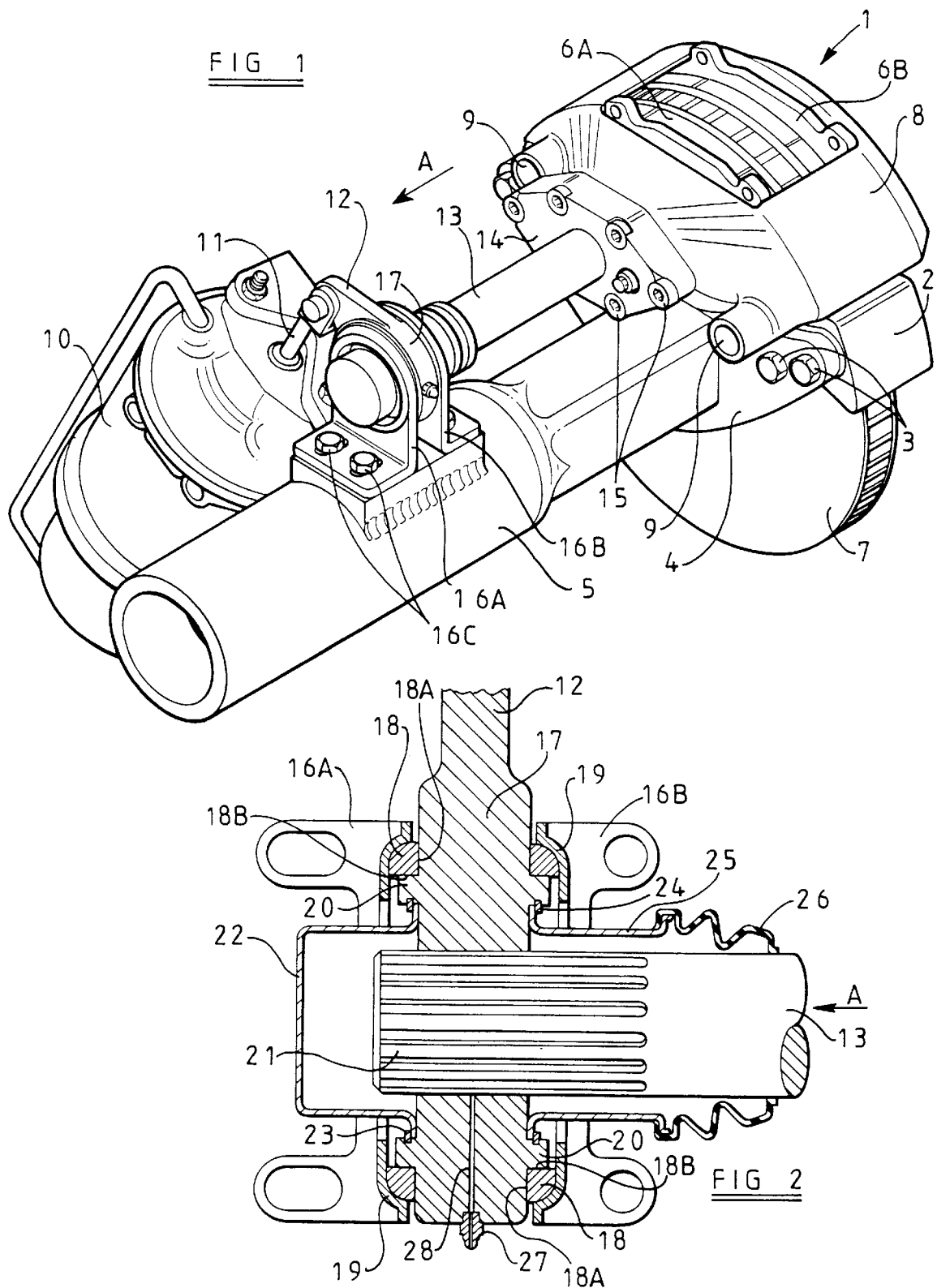

BRAKE AND ACTUATOR ASSEMBLY

BACKGROUND OF THE INVENTION

This invention relates to a brake and actuator assembly, primarily for a motor vehicle, of the general kind comprising a brake incorporating a shaft operable, in use, to cause friction elements of the brake to be urged against a rotary braking member, and coupling means between the shaft and a power device for operating the brake.

In mechanically actuated reaction type disc brakes, which include a caliper member associated with a rotary shaft and movable relative to a fixed carrier, wear of the friction linings takes place in a direction which is generally longitudinally of the shaft. It is usual for the brake to include adjuster means which compensates for friction lining wear, thereby keeping the rotational operative movement of the shaft to a minimum. Furthermore, wear of the friction linings is accompanied by a displacement of the caliper member and shaft relative to the fixed carrier. This displacement may be typically 20 mm from the new to the fully worn lining condition. Various proposals have been made to accommodate this displacement, such as incorporating a splined connection between components of the mechanism to provide for their relative movement in the shaft longitudinal direction. In some prior arrangements of this type incorporating additional components, further splined connections or other mechanisms are required, leading to complication and high manufacturing costs.

SUMMARY OF THE INVENTION

An object of the invention is to provide an improved brake and actuator assembly which is simpler and more cost effective than the aforesaid prior art arrangements.

According to the invention, the coupling means includes a splined connection between the shaft and the power device, whereby the position along the shaft at which the force from the power device is applied via the coupling device to the shaft is variable to accommodate friction lining wear in the brake, in use.

Conveniently, the shaft is formed with splines, typically on one end portion thereof, forming part of the splined connection.

Preferably, the coupling means includes a hollow circular rotatably mounted boss formed with internal splines complementary to and engaged with those on the shaft, the boss being conveniently rotatably mounted in a housing by way of bearing means and, typically, carrying an operating lever connectable to the power device.

The invention will now be described, by way of example, with reference to the accompanying drawings, in which:

BRIEF DESCRIPTION OF THE DRAWINGS

FIG. 1 is a perspective view of one form of vehicle disc brake incorporating the actuator assembly of the invention, and FIG. 2 is a view from above, partly in cross-section, of part of the brake actuator assembly shown in FIG. 1.

DESCRIPTION OF THE PREFERRED EMBODIMENT

FIG. 1 of the drawings illustrates one form of disc brake, illustrated generally at 1, of which a carrier 2 is secured by bolts 3 to an end flange 4 of a vehicle axle 5. The carrier 2 supports a pair of friction pad assemblies 6A, 6B in conventional manner at either side of a rotatable brake disc 7 associated in use with a wheel to be braked (not shown). The brake also includes a caliper 8 slidably mounted on pins 9 and incorporating a brake-actuating mechanism of conventional type, such as a ball and ramp or helical ramp arrangement, of which an adjustable tappet cooperates, usually by way of a spreader plate, with the adjacent directly actuated pad assembly 6A, the other pad assembly being operated indirectly by sliding of the caliper along the pins 9, as will be understood by those skilled in the art.

Motive power for brake actuation is provided by an air actuator 10 of conventional type, of which an output rod 11 is coupled, via an input lever 12, to a force input shaft 13, for which a bearing at the brake end thereof is provided within a housing 14 secured by bolts 15 to the caliper 8. The outer end of the shaft 13 is rotatably mounted in brackets 16A, 16B rigidly secured to the axle 5, as by illustrated bolts 16C.

As can be seen more clearly from FIG. 2, the lever 12 is integral with a circular boss 17 which is mounted by way of bearings, typically of plastics, brass or sintered material and illustrated as spherical radial bearings 18, within a housing formed by the brackets 16A, 16B. The bearings are housed within curved radially extreme portions 19 of the brackets and planar opposed respective surfaces 18A thereof are engaged against opposed axially facing sides of the boss 17. The aforesaid surfaces of the boss are formed with respective identical annular flanges 20, the radially outermost surfaces or shoulders of which bear against the adjacent internal surfaces 18B of the bearings 18. The lever is thereby constrained radially and axially whilst permitted rotational actuating movement under the action of the power device 10.

The adjacent end portion of the shaft 13 is provided with longitudinal splines 21 which engage corresponding splines within the boss 17 in order to provide a rotary driving connection between the lever 12 and shaft whilst at the same time permitting axial movement of the shaft within the boss. The outermost end of the shaft is covered by a cap 22, conveniently of pressed metal, which is held in place on the boss 17 by a circlip 23 engaged in a groove in the adjacent annular flange 20 and trapping a radial flange of the cap against the boss. A similar circlip 24 at the opposite side of the boss 17 traps a flange of a tubular element 25, conveniently of pressed metal, which acts to support one end of a protective boot 26, the other end of which engages around the shaft 13. Both the boot 26 and cap 22 serve to minimise the ingress to the sensitive sliding spline connection of foreign material, such as dust and water. The boss 17 is provided, at a location radially remote from the lever 12, with a nipple 27 permitting lubricating grease to be introduced along a passage 28 of the boss into the splines 21.

Rotation of the lever 12 by actuation of the power device 10 will in turn rotate the shaft 13 which operates the brake actuating mechanism within the brake in order to apply the friction pad assemblies 6A, 6B against the disc 7, in conventional manner. A certain amount of deflection may take place in the brake components during actuation, leading to an angular deflection of the shaft which is amplified at the splined end thereof. This deflection can either be accommodated in the splined connection with the lever or by the spherical bearings 18.

As wear of the friction pad assemblies takes place, the shaft 13 moves axially together with the caliper 8 and pad 6B in the direction of arrow A in FIGS. 1 and 2. This movement is permitted by way of the splined connection between the shaft and the boss 17 of the actuating lever. The formation of the splined connection at this location leads to an advantageous simplicity of construction, avoiding the use of an additional coupling along the shaft or within the actuating mechanism of the brake.

It is possible with the actuator assembly of the invention to provide for the interchangeability of cam-actuated drum brakes with the disc brake illustrated and described herein. The rotary actuator shaft mounted on such a drum brake enables the brake to be installed in place of the disc brake with the actuator shaft connected to the lever 12 by complementary splines, even though substantial axial displacement of the shaft may not be required.

I claim:

1. A brake and actuator assembly comprising a brake incorporating a shaft operable to cause friction elements of the brake to be urged against a rotary braking member, the shaft being operably connected to a brake-actuating mechanism of the brake for brake actuation and, at a location spaced from said brake-actuating mechanism, forming a splined connection with a coupling device coupled to an output member of a power device, whereby the position along the shaft at which force from the power device is applied via the coupling device to the shaft is variable to accommodate friction lining wear in the brake, an end portion of the shaft remote from the brake being provided with splines which form part of the splined connection, and the coupling means including a hollow boss formed with internal splines complementary to and engaged with those on the shaft, a circular part of the boss being rotatably mounted in a housing by way of bearing means.

2. An assembly according to claim 1, wherein bearing means are spherical radial bearings.

3. An assembly according to claim 2, wherein the bearings are such as to accommodate limited angular movement of the shaft.

4. An assembly according to claim 1, wherein the boss carries an operating lever connected to the power device.

5. An assembly according to claim 1, wherein the boss is provided with a radially facing shoulder at either side thereof which engages the bearing means for radial retention of the shaft, the boss being retained axially by engagement with the bearing means of its opposed axially facing sides.

6. An assembly according to claim 1, wherein the line of force application between the output member and shaft lies generally in a radial plane extending through said output member, coupling device and splined connection.

7. An assembly according to claim 1, wherein the housing is fixed.

8. A brake and actuator assembly comprising a brake incorporating a shaft operable to cause friction elements of the brake to be urged against a rotary braking member, the shaft being operably connected to a brake-actuating mechanism of the brake for brake actuation and, at a location spaced from said brake-actuating mechanism, forming a splined connection with a coupling device coupled to an output member of a power device, whereby the position along the shaft at which force from the power device is applied via the coupling device to the shaft is variable to accommodate friction lining wear in the brake, wherein the line of force application between the output member and shaft lies generally in a radial plane extending through said output member, coupling device and splined connection, wherein the coupling device includes a hollow circular rotatably mounted boss formed with internal splines complementary to and engaged with those on the shaft, and wherein the boss is rotatably mounted in a housing by way of bearing means.

9. An assembly according to claim 8, wherein the bearing means are spherical radial bearings.

10. An assembly according to claim 9, wherein the bearings are such as to accommodate limited angular movement of the shaft.

11. An assembly according to claim 10, wherein the boss is provided with a radially facing shoulder at either side thereof which engages the bearing means for radial retention of the shaft, the boss being retained axially by engagement with the bearing means of its opposed axially facing sides.

12. An assembly according to claim 9, wherein the boss is provided with a radially facing shoulder at either side thereof which engages the bearing means for radial retention of the shaft, the boss being retained axially by engagement with the bearing means of its opposed axially facing sides.

13. An assembly according to claim 8, wherein the boss is provided with a radially facing shoulder at either side thereof which engages the bearing means for radial retention of the shaft, the boss being retained axially by engagement with the bearing means of its opposed axially facing sides.

14. As assembly according to claim 8, wherein the boss carries an operating lever connected to the power device.

15. An assembly according to claim 8, wherein the housing is fixed.

* * * * *